No. 814,894. PATENTED MAR. 13, 1906.
W. N. WINFIELD & J. BARKER.
LEDGER.
APPLICATION FILED MAY 8, 1905.
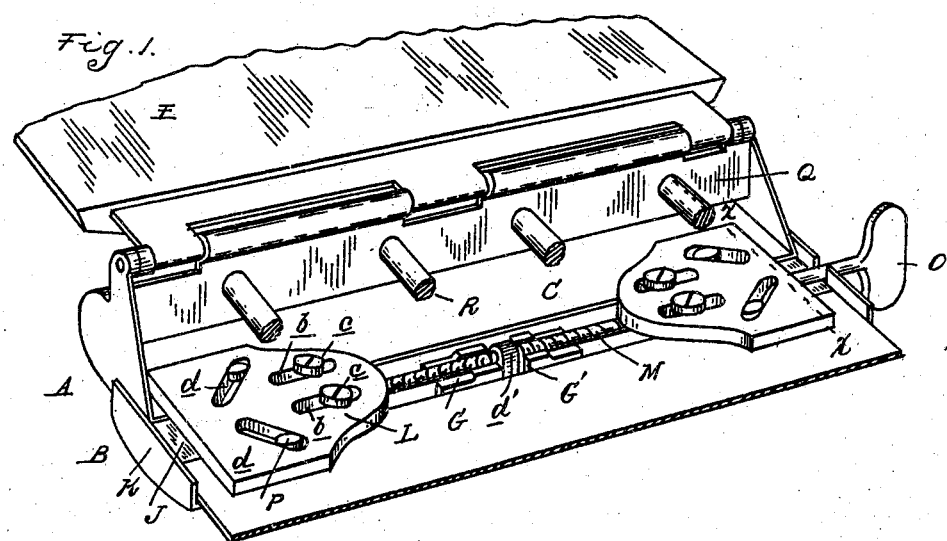
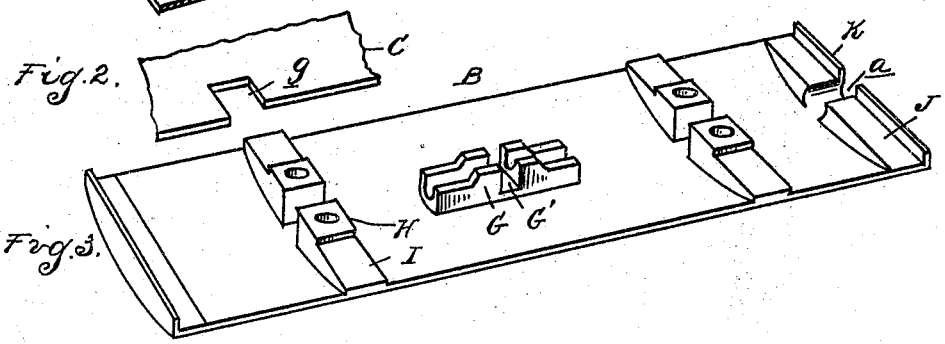
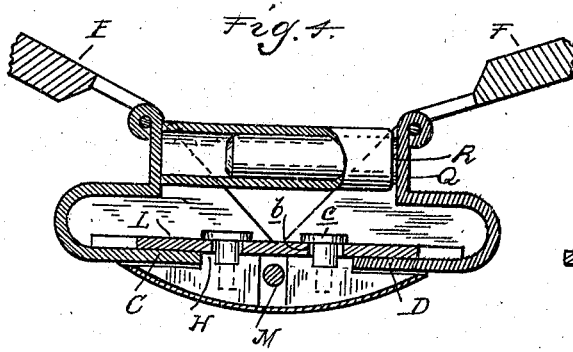
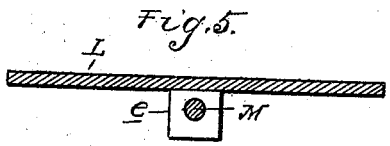
Witnesses
Inventors
William N. Winfield
James Barker
By James Whittemore
atty.

UNITED STATES PATENT OFFICE.

WILLIAM NELSON WINFIELD AND JAMES BARKER, OF DETROIT, MICHIGAN, ASSIGNORS TO THE RICHMOND & BACKUS COMPANY, OF DETROIT, MICHIGAN, A CORPORATION.

LEDGER.

No. 814,894.　　　Specification of Letters Patent.　　Patented March 13, 1906.

Application filed May 8, 1905. Serial No. 259,417.

*To all whom it may concern:*

Be it known that we, WILLIAM NELSON WINFIELD and JAMES BARKER, citizens of the United States, residing at Detroit, in the county of Wayne and State of Michigan, have invented certain new and useful Improvements in Ledgers, of which the following is a specification, reference being had therein to the accompanying drawings.

The invention relates particularly to a loose-leaf ledger, and has special reference to a novel type of back therefor, consisting of complementary sections adapted to be separated to permit of the insertion or withdrawal of leaves and closed after the leaves have been inserted.

The invention consists in the novel construction of the back, in the operating means for adjusting the back-sections, and in other details of construction, as more fully hereinafter set forth.

In the drawings, Figure 1 is a sectional perspective view of a ledger, showing our improved back therefor. Fig. 2 is a perspective view of a portion of one of the side sections. Fig. 3 is a detached perspective view of the back proper. Fig. 4 is a transverse section through the ledger-back, and Fig. 5 is a section taken on line $x\,x$, Fig. 1.

In the drawings thus briefly described the reference-letter A designates the ledger-back, comprising in this instance a back proper, B, in the form of a supporting-plate, upon which are mounted for transverse movement two complementary inclosing side sections C and D.

E and F represent the ledger-covers, which are hinged to the upper edges of the side sections in any suitable manner.

The back proper or "plate," as it will be hereinafter termed, is provided at its center with a longitudinal bearing G, having a cross-slot G' at intermediate points with separated bearings H and adjoining bearing-faces I below the bearings H and at its extreme ends with bearing J, forming in connection with the bearings I supports for the sides. The ends of the plate are also flanged, as indicated at K, to engage over the ends of the side sections, and the bearing J at one of the plate ends is grooved, as at $a$, to permit of the insertion through the back of the operating member for the sides.

Mounted upon each pair of bearings H is an adjusting-plate L, slotted, as at $b\,b$, to receive securing-screws $c\,c$, which serve to hold the plates upon the back plate, and provided with a pair of guide-slots, as $d\,d$. Upon the adjoining ends of the plates described are threaded bearings $e$, engaged by right and left hand threads, respectively, upon a screw member M, which forms the operating device for the plates and which upon actuation compels movement of the plates toward or away from each other, the screw member, as shown, engaging the central bearing G and having a shoulder $d'$, engaging the cross-slot G' to form the swivel. To permit of its operation, the screw projects beyond one side of the ledger, as indicated in Fig. 1, and is preferably squared at its end, so as to be operated by a suitable key, as O.

The side sections C and D are provided with projections in the form of pins P, which engage the guide-slots, as indicated, and carry on their vertical portions Q each a series of post-sections R, the posts being preferably of telescopic type, having the usual engagement indicated in Fig. 4. The meeting edges of the side sections are also recessed, as at $g$, to receive the bearings H and permit the sides to be moved into close proximity with one another when the ledger is closed.

In use when it is desired to remove a leaf of the ledger or insert another the operator by actuating the screws causes the adjusting-plates for the sides to either move apart or toward each other, according as the ledger is to be opened or closed. The plates acting upon the pins in the guide-slots compel the desired transverse movement of the side sections and also lock the sides in any desired position relative to the back plate.

What we claim is—

1. In a loose-leaf ledger, the combination with a ledger-back comprising a back proper and transversely-movable side sections thereon, of adjusting-plates for said side sections each having two pairs of guide-slots, one of said pairs engaging projections on said back proper, the other pair engaging projections on said side sections and means of adjusting said plates, for the purpose described.

2. In a loose-leaf ledger, the combination with a ledger-back comprising a back proper and transversely-movable side sections, of vertical and horizontal end bearings and horizontal intermediate bearings on said back proper engaging the side sections, for the purpose described.

3. In a loose-leaf ledger, the combination with a ledger-back comprising a back proper and transversely-movable sides, of means mounted on said back proper for adjusting said side sections, bearings on said back proper engaging said side sections, and legs on said back proper engaging notches in said side sections, for the purpose described.

4. In a loose-leaf ledger, the combination with the ledger-back comprising a back plate and two complementary inclosing side sections mounted upon the plate for sliding movement transversely thereof, adjusting-plates secured to the back plate for longitudinal movement, each provided with two pairs of guide-slots, projections upon the side sections engaging one pair of said slots, projections on the back plate engaging the other pair of slots, and a screw swiveled upon the back plate and having right and left hand threads engaging the adjusting-plates.

In testimony whereof we affix our signatures in presence of two witnesses.

WILLIAM NELSON WINFIELD.
    JAMES BARKER.

Witnesses:
 AMELIA WILLIAMS,
 JAMES P. BARRY.